United States Patent [19]

Holley

[11] Patent Number: 5,508,343
[45] Date of Patent: Apr. 16, 1996

[54] ANTISTATIC COMPOSITION, METHOD, AND COATED ANTISTATIC SURFACE

[75] Inventor: Leonard Holley, Edgemon, S.C.

[73] Assignee: Rexam Industries Corporation, Matthews, N.C.

[21] Appl. No.: 299,210

[22] Filed: Aug. 31, 1994

[51] Int. Cl.$^6$ .................. C08J 5/10; C08K 5/00; C08L 79/00
[52] U.S. Cl. ............ 524/161; 524/910; 524/911; 524/413; 524/176; 524/430; 524/912; 427/485; 428/411.1
[58] Field of Search .................. 524/161, 910, 524/911, 912, 413, 176, 430; 427/472.2; 428/411.1

[56] References Cited

U.S. PATENT DOCUMENTS

| | | | |
|---|---|---|---|
| 3,288,770 | 11/1966 | Butler | 260/88.3 |
| 4,094,853 | 6/1978 | Monte et al. | 260/40 R |
| 4,482,476 | 11/1984 | Yoshimura et al. | 252/511 |
| 4,715,968 | 12/1987 | Sugerman et al. | 252/8.6 |
| 4,808,478 | 2/1989 | Dana et al. | 428/391 |
| 4,818,245 | 4/1989 | Jachowicz et al. | 8/188 |
| 4,861,663 | 8/1989 | Sirinyan et al. | 428/409 |
| 5,004,562 | 4/1991 | Kissel | 252/518 |
| 5,071,593 | 12/1991 | Takahashi et al. | 252/500 |
| 5,145,602 | 9/1992 | Kissel | 252/309 |
| 5,151,457 | 9/1992 | Ishida et al. | 524/157 |
| 5,173,214 | 12/1992 | Kissel | 252/518 |
| 5,182,169 | 1/1993 | Fukuda et al. | 428/343 |
| 5,268,407 | 12/1993 | Hayashi et al. | 524/398 |

OTHER PUBLICATIONS

Product Description Sheet: Ken–Stat™ Antistatic Agents.
Product Brochure for Conductive Polymer 261® RV, Product No. 6090, Calgon Corporation, 1978 (Bulletin 28–3a).
Article regarding Minatec® CM (undated).
Product Brochure for Conductive Polymer 261® LV, Product No. 6118, Calgon Corporation, 1978 (Bulletin 28–4a).

*Primary Examiner*—Paul R. Michl
*Assistant Examiner*—U. K. Rajguru
*Attorney, Agent, or Firm*—Bell, Seltzer, Park & Gibson

[57] ABSTRACT

An antistatic composition comprising an admixture of a water soluble polymer of a quaternary ammonium salt and a an amino or sulfonyl titanate or zirconate composition. The titanate or zirconate composition is present in the admixture in an amount sufficient to reduce the moisture sensitivity of the quaternary ammonium salt polymer while retaining its antistatic properties. The antistatic properties of the composition are greater than the additive antistatic properties of the polymer and the titanate or zirconate composition. An associated method and coated antistatic surface are also disclosed.

34 Claims, No Drawings

5,508,343

ANTISTATIC COMPOSITION, METHOD, AND COATED ANTISTATIC SURFACE

FIELD OF THE INVENTION

The present invention relates to antistatic or static dissipative compositions and in particular relates to a water soluble composition that can be applied from an aqueous solution and coated on various substrates to give them desired antistatic properties.

BACKGROUND OF THE INVENTION

The rapid growth in the semiconductor electronics industry over a wide range of applications, has led to some associated packaging, handling, and operating considerations for electronic devices. One consideration for many electronic devices is that static electricity be controlled in some fashion. For example, because electronic components are becoming smaller and smaller, and operating on smaller power and current levels, the generation of static electricity, which would be considered no more than a nuisance in other circumstances (e.g., getting a shock after walking on a synthetic carpet), can become a significant problem with electronic components and devices. For example, static electricity can affect the memory or performance characteristics of small integrated circuits or "chips." From a physical standpoint, static electricity, which has the tendency to cause small objects to be attracted to one another, can cause handling problems when the small delicate parts used in many electronic applications are being physically handled. Static electricity can affect memory or programming aspects of a chip either temporarily or permanently and can interfere with the operation of electronic devices, or their memory components, in a number of ways including loss of data on magnetic media, equipment damage, and even fire hazards.

Accordingly, control of static electricity, whether by shielding, grounding, or some other technique is a necessary consideration in the manufacture and use of electronic devices.

One application for which static electricity must be controlled is the handling during manufacture of semiconductor chips as they are being assembled into larger circuits and electronic devices. One such handling technique is set forth in copending application Ser. No. 08/252,177, U.S. Pat. No. 5,447,784, filed Jun. 2, 1994, for "STATIC DISSIPATIVE COVER TAPE" which is assigned to the assignee of the present invention. As set forth therein, in order to be conveniently packaged for automated or robotic handling and assembly, integrated circuits are often packaged in longitudinal strip packages which consist of molded pockets covered with an adhesive tape that completes the package. The adhesive tape is removed and the pocketed carrier advanced by mechanical devices. Because the chips are sensitive to static electricity, the packaging tape must likewise be either antistatic or static dissipating in character.

As generally used in this field, the terms "antistatic" and "static dissipating" both refer to the same property: conductivity. The term "static dissipating" generally refers to a higher conductivity than does the term "antistatic." For example, antistatic is often used to characterize resistivities of $10^9$ to $10^{14}$ ohms per square, while static dissipative is used to characterize resistivities of $10^5$ to $10^9$ ohms per square. It will be understood that these terms are thus used descriptively rather than in any absolute or unreasonably limiting sense.

One way to make a cover tape—or indeed any similar surface—static dissipating or antistatic in character is to coat it with a composition that will both adhere to the tape and provide the necessary conductivity properties. Conductive coatings can be formed of a number of different materials, all of which have various advantages and disadvantages. For example, a thin metal coating will be conductive and therefore antistatic or static dissipating, but metal coatings can be expensive and difficult to apply. Furthermore, when metals are applied in amounts sufficient to provide the necessary conductivity, they may make the surface opaque, or otherwise change its appearance, a factor which is undesirable in many circumstances.

Other conductive materials such as carbon black are appropriate in different circumstances, but as with metals, carbon black (as indicated by its common name) is generally unsuitable for antistatic or static dissipating applications where the color or transparency of a given substrate are of importance to the finished product.

Additional choices for conductive materials include monoacyl glycerides, monoalkyl phosphates, and various metallocenes. Some of these exhibit solubility problems, however, or tend to decompose at lower temperatures than are generally convenient for use in certain circumstances.

Yet another category of antistatic compositions includes the quaternary ammonium salts; i.e., organic nitrogen compounds that include a central nitrogen atom joined to four organic groups (the cation) and a negatively charged acid radical (the anion). Lewis, HAWLEY'S CONDENSED CHEMICAL DICTIONARY, 12th Ed. (1993) p. 986. These salt compositions are well-known, predictable in their antistatic characteristics, and soluble in water and in certain organic solvents. They tend, however, to be quite sensitive to relative humidity and in particular their conductive properties tend to fade or disappear at lower relative humidities; i.e., relative humidities of about 20% or less. Therefore, they are either undesirable or simply unusable for particular applications.

Therefore, there exists the need for compositions that can produce antistatic or static dissipating properties on substrates that can be easily coated on those substrates, will adhere to them properly, and will provide antistatic properties even under varying conditions of relative humidity.

OBJECT AND SUMMARY OF THE INVENTION

Accordingly, it is an object of the present invention to provide compositions that produce antistatic or static dissipating properties on substrates that are independent of conditions of varying humidity, and that can be coated onto substrates in a straightforward manner.

The invention meets this object with an antistatic composition that comprises an admixture of a water soluble polymer of a quaternary ammonium salt and an amino or sulfonyl titanate or zirconate composition. The titanate or zirconate composition is present in the admixture in an amount sufficient to reduce the moisture sensitivity of the quaternary ammonium salt polymer while retaining its antistatic properties, and wherein the antistatic properties of the composition are greater than the additive antistatic properties of the polymer in the titanate or zirconate compound.

In another aspect, the invention is an aqueous solution of the water soluble polymer of the quaternary ammonium salt and the titanate or zirconate composition.

In a further aspect, the invention is a method of coating a substrate with the solution of the admixture of the quaternary ammonium salt and the titanate or zirconate composition.

In yet another aspect, the invention comprises a surface coated with the admixture of the water soluble water polymer of the quaternary ammonium salt and the titanate or zirconate composition to give that surface antistatic properties.

The foregoing and other objects, advantages and features of the invention, and the manner in which the same are accomplished, will become more readily apparent upon consideration of the following detailed description of the invention which illustrates preferred and exemplary embodiments.

DETAILED DESCRIPTION

The invention is an antistatic composition comprising an admixture of a water soluble polymer of a quaternary ammonium salt and an amino or sulfonyl titanate or zirconate composition. The titanate or zirconate composition is present in the admixture in an amount sufficient to reduce the moisture sensitivity of the quaternary ammonium salt polymer while retaining antistatic properties so that the antistatic properties of the composition are unexpectedly and apparently synergistically greater than the additive antistatic properties of the polymer and the titanate or zirconate composition.

As noted above, quaternary ammonium salts are well-known chemical formulations that are of ionic character. In preferred embodiments of the present invention, the quaternary ammonium salt polymers are linear higher molecular weight water soluble polymers that have the formulas described in U.S. Pat. No. 3,288,770, to Butler, issued Nov. 29, 1966 for "Water Soluble Quaternary Ammonium Polymers", the contents of which are incorporated entirely herein by reference. These quaternary ammonium salt polymers are also described in U.S. Pat. No. 5,268,407 to Hayashi et al., which is also incorporated entirely herein by reference.

Exemplary commercial embodiments of these quaternary ammonium salt polymers are available from the Specialties Group of Calgon Corporation under the designations "Conductive Polymer 261®RV" and "Conductive Polymer 261®LV". Generally speaking, the 261® conductive polymers are used for controlling and increasing the electrical conductivity of sensitized papers in various electrographic and photographic reproduction techniques. According to the Calgon Corporation, the 261® polymers promote better copy contrast and prevent toner pickup in non-imaged areas.

As is the case with most quaternary ammonium salts, however, the polymers described herein, including the 261® polymers, vary greatly in their conductivity depending upon relative humidity. In particular, the quaternary ammonium salt polymers that are most preferred in the present invention have conductivities about $1 \times 10^{12}$ ohms per square at about 5% relative humidity and about $5 \times 10^5$ ohms per square at about 90% relative humidity. Thus, although these compounds are useful in some circumstances, they are less desirable in others.

As set forth above, the compositions of the present invention further comprise an amino or sulfonyl titanate or zirconate. In preferred embodiments, the titanate or zirconate composition is one of those described and claimed in U.S. Pat. No. 4,715,968 to Sugarman, et al., issued Dec. 29, 1987, and the contents of which are incorporated entirely herein by reference. In more preferred embodiments the composition comprises an amino titanate or zirconate and a sulfonyl titanate or zirconate, including titanium (IV) neoalkoxy titanates. In the most preferred embodiments the titanate or zirconate composition comprises a mixture of an amino titanate and a sulfonyl titanate.

As used herein, the term neoalkoxy refers to the presence of four (4) alkoxy groups joined to the titanium. In turn, the term alkoxy refers to the ester-like structure of the organic groups joined to the titanium (IV) ion.

Exemplary formulations for the titanium (IV) neoalkoxy compounds are available under the Ken-Stat™ designation from Kenrich Petrochemicals, Inc., 140 East 22nd Street, P. O. Box 32, Bayonne, N.J. 07002. Typical formulations include Ken-Stat™ KS Q100P which is a mixture of about 55% by weight bis(dodecyl)benzenesulfonato-o bis(2-ethylenediamino)ethylato titanium (IV) and about 45% by weight of a polyethylene glycol (a-hydro-w-hydroxy poly-(oxy-1,2-ethanediyl)); and Ken-Stat™ N100 which is a mixture of 2,2-(bis-2-propenolatomethyl) butanolato tris-(dodecyl)benzenesulfonato-o titanium (IV) (about 54% by weight), a proprietary amino alkoxy titanium compound designated "Ken-React Lica 44B" (about 22% by weight), and dodecylbenzene (about 18% by weight). It will be understood, however, that similar compositions can be incorporated into the present invention provided that they give the desired antistatic properties, but without deleteriously affecting the antistatic properties of the compositions of the present invention.

As described in the Sugarman patent, these titanate or zirconate compositions are mixed with polyethylene glycol or a structurally very similar compound. Then, the titanate or zirconate compounds are mixed or otherwise blended with polymers in a manner other than surface application and before the polymers are finally set to thereby produce polymers with reduced static buildup tendencies.

It has been unexpectedly found according to the present invention, however, that if the titanate or zirconate composition is mixed with the quaternary ammonium salt polymers in a mixture of about ten parts of the quaternary ammonium salt polymer with about one part of the titanate or zirconate composition, a combined synergistic antistatic property results in which the antistatic properties of the admixture are greater than those of the quaternary ammonium salt and the titanium (IV) composition added together.

Such a synergistic result from the addition of approximately ten percent (10%) by weight of the titanate or zirconate is particularly unexpected because of the ionic and molecular mechanisms through which antistatic or static dissipating compositions tend to work.

For example, as noted above the quaternary ammonium salt polymer has a conductivity of about $1 \times 10^{12}$ ohms per square at about 5% relative humidity and about $5 \times 10^5$ ohms per square at about 90% relative humidity. The titanate or zirconate composition has a conductivity of between about $1 \times 10^8$ and $1 \times 10^9$ ohms per square at relative humidities of between about 20% and 50%. When these are mixed together in accordance with the present invention, however, the admixture has conductivity of about $1 \times 10^5$ ohms per square at relative humidities of between about 20% and 50%. The conductivities herein were measured according to ASTM-258 using a Kiethley electrometer with a 100 volt power supply, and with both concentric circle and two-point probes.

In other words, the overall conductivity of compositions according to the present invention appears to be better than the best conductivity of the quaternary ammonium salt standing alone at the most favorable conditions of relative humidity, and yet will exhibit this greater conductivity of all levels of relative humidity.

In another aspect and because both the quaternary ammonium salt polymer and the titanate or zirconate composition are water soluble, the invention comprises an aqueous solution of the quaternary ammonium salt polymer and the titanate or zirconate composition in which the titanate or zirconate composition is present in the solution in an amount sufficient, when the solution is deposited on a substrate and water substantially removed, to reduce the moisture sensitivity of the quaternary ammonium salt polymer while retaining its antistatic properties. As in the other embodiments, the antistatic properties of the composition of the invention are greater than the additive antistatic properties of the polymer and the titanate or zirconate compound. As noted above, the quaternary ammonium salt and the titanate or zirconate composition are preferably present in a ratio of about ten to one (10:1) by weight, quaternary ammonium salt polymer to titanate or zirconate composition.

In preferred embodiments of this aspect of the invention, the aqueous solution comprises at least about 60% by weight water; i.e., about 40% by weight of the composition. It will be understood, however, that the preferred concentration can be diluted to produce various other concentrations suitable for various coating techniques or applications. As in the earlier embodiments, the titanate or zirconate composition can comprise one or more an amino or sulfonyl titanate or zirconate compounds. Similarly, the unexpected synergistic improvement in conductivity and resulting antistatic properties occurs when the invention is expressed as a solution as well.

In other embodiments, the antistatic composition according to the present invention can be incorporated into a water-based polymer binder such as acrylic, urethane, or ethylene vinyl acetate polymers.

As an unexpected further benefit, the quaternary ammonium salts, which tends to exhibit poor wetting properties on certain surfaces, wets those surfaces quite well when mixed in this fashion with the organotitanate.

In yet another aspect the invention can further comprise a method of producing a surface with antistatic properties by applying the composition to the surface and then drying the surface to remove water while leaving the antistatic composition in place. Preferably, when the composition is applied in water solution in which water is present by at least 60% by weight of this solution, the solution is applied in an amount of between about 0.5 and 1.5 pounds per ream. Because a ream represents three thousand square feet (3,000 ft$^2$), this is about the same as adding between about 0.8 and 2.4 grams per square meter.

Accordingly, the invention can further comprise a substrate surface coated with the solution of the invention. In this aspect, the invention comprises a substrate, and an antistatic composition on the substrate. The antistatic composition comprises the admixture of the water soluble polymer of the quaternary ammonium salt and the titanate or zirconate composition, and with the titanate or zirconate composition present in the admixture in an amount sufficient to reduce the moisture sensitivity of the quaternary ammonium salt polymer while retaining its antistatic properties. As in the other embodiments, the antistatic properties of the composition are greater than the additive antistatic properties of the polymer and the titanate or zirconate composition.

In preferred embodiments, the antistatic surface can comprise a transparent polymer, examples of which are well-known to those familiar with this art. For example, polyester, polyethylene, polypropylene, other polyolefins, saran, polyurethanes, polyvinyl chloride (PVC), and numerous other polymers are appropriate substrates. It will be understood that these specific polymer types are given here by way of example and not by way of limitation.

When the composition of the invention is applied as previously described and the surface then dried, the composition will be present on the surface in an amount of between 0.3 and 0.9 pounds per ream (about 0.48 and 1.44 grams per square meter). As in the earlier described embodiments, the titanate or zirconate composition can comprise either a single an amino or sulfonyl titanate or zirconate compound or a combination of two or more an amino or sulfonyl titanate or zirconate compounds. Similarly, the quaternary ammonium salt polymer has a conductivity of about $1 \times 10^{12}$ ohms per square at about 5% relative humidity increasing to about $5 \times 10^5$ ohms per square at about 90% relative humidity, while the titanate or zirconate composition has a conductivity of between about $1 \times 10^8$ and $1 \times 10^9$ ohms per square at substantially all relative humidities. The resulting composition on the surface, however, has conductivity of about $1 \times 10^5$ ohms per square at substantially all relative humidities.

As in the earlier embodiments, the preferred admixture comprises about ten parts of quaternary ammonium salt polymer and about one part of the an amino or sulfonyl titanate or zirconate composition. Furthermore, in preferred embodiments the titanate or zirconate composition further comprises a mixture of the composition with a polymer, and the most preferred embodiments comprises a mixture of about 55% by weight of a titanium (IV) neoalkoxy composition and about 45% by weight of a polyethylene polymer.

EXAMPLE

Ten parts by weight of a quaternary ammonium salt provided from Calgon Corporation, under the designation Calgon Conductive Polymer 261LV are admixed with approximately one part by weight of a titanate composition under the designation KEN-STAT™ KS Q 100P. The composition is then mixed with about 60 percent by weight water (i.e., 40% by weight composition and 60% by weight water). This solution is applied to a surface of a transparent polyolefin polymer to produce a surface coated with between about 0.8 and 2,4 grams per square meter which is then dried. The conductivity of the resulting surface is measured according to ASTM-258 using a Kiethley electrometer with a 100 volt power supply, and with both concentric circle and two point probes. In all cases, the resulting conductivity is approximately $1 \times 10^5$ ohms per square at all relative humidities between 20 and 50%.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. An antistatic composition comprising:
   an admixture of,
   a water soluble polymer of a quaternary ammonium salt; and
   a water soluble metal oxide composition selected from the group consisting of amino titanates, sulfonyl titanates, amino zirconates and sulfonyl zirconates;
   wherein said water soluble metal oxide composition is present in said admixture in an amount sufficient to reduce the moisture sensitivity of said quaternary ammonium salt polymer while retaining its antistatic properties and to give the admixture antistatic properties that are greater than the additive antistatic properties of said quaternary ammonium salt polymer and said metal oxide composition.

2. An antistatic composition according to claim 1 wherein said titanate or zirconate composition comprises a titanium (IV) neoalkoxy compound.

3. An antistatic composition according to claim 1 wherein said titanate or zirconate composition comprises a combination of at least two titanium (IV) neoalkoxy compounds.

4. An antistatic composition according to claim 1 wherein said titanate or zirconate composition comprises an amino titanate or zirconate and a sulfonyl titanate or zirconate.

5. An antistatic composition according to claim 1 wherein said titanate or zirconate composition comprises an amino titanate and a sulfonyl titanate.

6. An antistatic composition according to claim 1 wherein:

said quaternary ammonium salt polymer has a conductivity of about $1 \times 10^{12}$ ohms per square at about 5 percent relative humidity and about $5 \times 10^5$ ohms per square at about 90 percent relative humidity;

said titanate or zirconate composition has a conductivity of between about $1 \times 10^8$ and $1 \times 10^9$ ohms per square at substantially all relative humidities; and said admixture has a conductivity of about $1 \times 10^5$ ohms per square at substantially all relative humidities.

7. An antistatic composition according to claim 1 wherein said admixture comprises about 10 parts of said quaternary ammonium salt polymer, and about 1 part of said titanate or zirconate composition.

8. An antistatic composition according to claim 1 wherein said titanate or zirconate composition comprises a mixture of at least one titanium neoalkoxy (IV) composition and a polymer.

9. An antistatic composition according to claim 8 wherein said titanium (IV) neoalkoxy composition comprises a mixture of about 55 percent by weight of at least one titanium neoalkoxy (IV) composition and about 45 percent by weight of a polyethylene glycol polymer.

10. An antistatic composition according to claim 1 wherein said admixture further comprises a water-based polymer binder selected from the group consisting of acrylic, urethane, and ethylene vinyl acetate polymers.

11. A composition for being applied to surfaces to provide those surfaces with antistatic properties, said antistatic composition comprising:

an aqueous solution of
  a water soluble polymer of a quaternary ammonium salt; and
  a water soluble metal oxide composition selected from the group consisting of amino titanates, sulfonyl titanates, amino zirconates and sulfonyl zirconates;

wherein said water soluble metal oxide composition is present in said solution in an amount sufficient, when said solution is deposited on a substrate and water substantially removed, to reduce the moisture sensitivity of said quaternary ammonium salt polymer while retaining its antistatic properties and to give the substrate surface antistatic properties that are greater than the additive antistatic properties of said quaternary ammonium salt polymer and said metal oxide composition.

12. A composition according to claim 11 wherein said quaternary ammonium salt polymer and said titanate or zirconate composition are present in a ratio of about 10:1 by weight, quaternary ammonium salt polymer:titanate or zirconate composition.

13. A composition according to claim 12 wherein said solution is at least about 60 percent by weight water.

14. A composition according to claim 11 wherein said titanate or zirconate composition comprises a titanium (IV) neoalkoxy compound.

15. A composition according to claim 11 wherein said titanate or zirconate composition comprises a combination of at least two titanium (IV) neoalkoxy compounds.

16. A composition according to claim 11 wherein said titanate or zirconate composition comprises an amino titanate or zirconate and a sulfonyl titanate or zirconate.

17. A composition according to claim 11 wherein said titanate or zirconate composition comprises an amino titanate and a sulfonyl titanate.

18. A composition according to claim 11 wherein:

said quaternary ammonium salt polymer has a conductivity of about $1 \times 10^{12}$ ohms per square at about 5 percent relative humidity and about $5 \times 10^5$ ohms per square at about 90 percent relative humidity;

said titanate or zirconate composition has a conductivity of between about $1 \times 10^8$ and $1 \times 10^9$ ohms per square at substantially all relative humidities; and said admixture has a conductivity of about $1 \times 10^5$ ohms per square at substantially all relative humidities.

19. A composition according to claim 11 wherein said aqueous solution further comprises a water-based polymer binder selected from the group consisting of such as acrylic, urethane, and ethylene vinyl acetate polymers.

20. A method of producing a surface with antistatic properties comprising:

applying the composition of claim 11 to the surface; and drying the surface to remove water while leave the antistatic composition in place.

21. A method according to claim 20 wherein the step of applying the composition to the surface comprises applying the composition in a water solution in which water is present in at least 60 percent by weight of the solution and in the amount of between about 0.5 and 1.5 pounds per ream.

22. A substrate surface coated with the solution of claim 11.

23. A surface with antistatic properties comprising:

a substrate; and an antistatic composition on said substrate, said antistatic composition comprising:
  an admixture of a water soluble polymer of a quaternary ammonium salt and a water soluble metal oxide composition selected from the group consisting of amino titanates, sulfonyl titanates, amino zirconates and sulfonyl zirconates, wherein said water soluble metal oxide composition is present in said admixture in an amount sufficient to reduce the moisture sensitivity of said quaternary ammonium salt polymer while retaining its antistatic properties and to give the admixture antistatic properties that are greater than the additive antistatic properties of said quaternary ammonium salt polymer and said metal oxide composition.

24. An antistatic surface according to claim 23 wherein said substrate comprises a transparent polymer.

25. An antistatic surface according to claim 23 wherein said composition is present on said surface in an amount of between about 0.3 and 0.9 pounds per ream.

26. An antistatic surface according to claim 23 wherein said titanate or zirconate composition comprises a titanium (IV) neoalkoxy compound.

27. An antistatic surface according to claim 23 wherein said titanate or zirconate composition comprises a combination of at least two titanium (IV) neoalkoxy compounds.

28. An antistatic surface according to claim 23 wherein said titanate or zirconate composition comprises an amino titanate or zirconate and a sulfonyl titanate or zirconate.

29. An antistatic surface according to claim 23 wherein said titanate or zirconate composition comprises an amino titanate and a sulfonyl titanate.

30. An antistatic surface according to claim 23 wherein:
   said quaternary ammonium salt polymer has a conductivity of about $1 \times 10^{12}$ ohms per square at about 5 percent relative humidity and about $5 \times 10^5$ ohms per square at about 90 percent relative humidity;
   said titanate or zirconate composition has a conductivity of between about $1 \times 10^8$ and $1 \times 10^9$ ohms per square at substantially all relative humidities; and
   said admixture has a conductivity of about $1 \times 10^5$ ohms per square at substantially all relative humidities.

31. An antistatic surface according to claim 23 wherein said admixture comprises about 10 parts of said quaternary ammonium salt polymer, and about 1 part of said titanate or zirconate composition.

32. An antistatic surface according to claim 23 wherein said titanate or zirconate composition comprises a mixture of at least one titanium neoalkoxy (IV) composition and a polymer.

33. An antistatic surface according to claim 32 wherein said titanium (IV) neoalkoxy composition comprises a mixture of about 55 percent by weight of at least one titanium neoalkoxy (IV) composition and about 45 percent by weight of a polyethylene glycol polymer.

34. An antistatic surface according to claim 23 wherein said admixture further comprises a water-based polymer binder selected from the group consisting of such as acrylic, urethane, and ethylene vinyl acetate polymers.

* * * * *

UNITED STATES PATENT AND TRADEMARK OFFICE
CERTIFICATE OF CORRECTION

PATENT NO. : 5,508,343
DATED : April 16, 1996
INVENTOR(S) : Holley

It is certified that error appears in the above-identified patent and that said Letters Patent is hereby corrected as shown below:

Column 6, line 44, "2,4" should be --2.4--.

Signed and Sealed this

Twenty-fifth Day of March, 1997

Attest:

BRUCE LEHMAN

Attesting Officer     Commissioner of Patents and Trademarks